United States Patent [19]

Chertok

[11] 3,876,984

[45] Apr. 8, 1975

[54] APPARATUS FOR UTILIZING AN A.C. POWER LINE TO COUPLE A REMOTE TERMINAL TO A CENTRAL COMPUTER IN A COMMUNICATION SYSTEM

[75] Inventor: Allan Chertok, Bedford, Mass.

[73] Assignee: Concord Computing Corporation, Bedford, Mass.

[22] Filed: Apr. 19, 1974

[21] Appl. No.: 462,323

[52] U.S. Cl. ............ 340/152 R; 340/310; 340/151; 340/149 A

[51] Int. Cl. ........................ H04q 9/00; H04q 11/02

[58] Field of Search ........ 340/152, 151, 152 R, 163, 340/310, 149 A; 179/2 DP

[56] References Cited

UNITED STATES PATENTS 3,821,705 6/1974 Chertok ......................... 340/152 R

*Primary Examiner*—Harold I. Pitts
*Attorney, Agent, or Firm*—Kenway & Jenney

[57] ABSTRACT

A system for interfacing a telephone party line extending from a central computer with a number of remote inquiry terminals. The system includes an a.c. power line disposed between the party line and the remote inquiry terminals, a line buffer modem (modulator/demodulator) connected between the party line and the power line, and a plurality of terminal modems each being associated with a one of the remote inquiry terminals and connected between the power line and the respective remote inquiry terminal. The communication signals received from a telephone party line are applied to the line modem connected to that line and transformed to a suitable form for transmission over an a.c. power line. The signals are then applied to the power line. The remote terminal modems transform the signal received from the power line back to suitable form for receipt by its associated remote terminal. Similarly, signals from the various remote terminals are transformed by the associated terminal modems to a form suitable for transmission and then transmitted over the a.c. power line to the line modem, where they are again transformed into signals suitable for retransmission over the telephone party line to a central computer.

7 Claims, 7 Drawing Figures

APPARATUS FOR UTILIZING AN A.C. POWER LINE TO COUPLE A REMOTE TERMINAL TO A CENTRAL COMPUTER IN A COMMUNICATION SYSTEM

BACKGROUND OF THE INVENTION

This invention relates to data communication systems and more particularly to a system for communication between a centrally located computer and a number of remote inquiry terminals.

It is well known in the art to interconnect data terminals at a plurality of remote locations to a centrally located computer via a cable system. The interconnecting cable system in such communication networks may comprise specially installed cables connecting each of the remote locations. In an alternative form, existing telephone lines may be adapted for that purpose. It is well known to have a time-sharing computer system wherein a centrally located computer is interconnected via leased telephone lines to a plurality of dispersed remote time-sharing terminals. See, for example, the system for interrogating a computer by telephone lines from a number of dispersed inquiry locations included on a party line, as shown in U.S. application Ser. No. 296,790, filed Oct. 12, 1972, now U.S. Pat. No. 3,821,705 assigned to the assignee of the present invention, the disclosure of which is incorporated herein by reference.

Such systems may be used to provide a credit verification system for a number of retail stations within a department store which may itself be located in a city separate from the location of the central computer. In communication systems of this general type, the communication link is a leased telephone line running from a data multiplexing unit at the computer to a distribution sub-system at the other end of the leased telephone line for connecting on a time-shared basis the various terminals at each retail station. Such a system is burdened with a substantial disadvantage based on the inherent inflexibility of the inter-terminal cable network associated with the distribution sub-system. Future changes in the spatial distribution of terminals must either utilize the existing telephone cable network or require expensive additional hard wiring. This problem is accentuated when the system is initially installed in any finished existing building. The installation of the required telephone lines for an add-on credit verification system having a plurality of dispersed inquiry locations, not only requires a substantial effort and accompanying expense, but is still constrained to operate with a hard-wired cable network.

SUMMARY OF THE INVENTION

It is an object of this invention to provide a system for interfacing a telephone party line from a central computer with a plurality of remote inquiry terminals utilizing an a.c. power line.

It is another object of this invention to provide a flexible interface system between a telephone party line and a plurality of remote inquiry terminals to facilitate relocation of the remote terminals.

A system in accordance with the present invention comprises an a.c. power line disposed between a telephone party line and a plurality of remote inquiry terminals. A line modem (modulator/demodulator) is connected between the party line and the power line.

A plurality of terminal modems (modulator/demodulator), each being associated with a one of the remote inquiry terminals, is connected between the power line and the respective remote inquiry terminal.

In a typical embodiment, such as a credit verification system, as described in U.S. application Ser. No. 296,790, filed Oct. 12, 1972 now U.S. Pat. No. 3,821,705 and assigned to the assignee of the present invention, a central digital computer is connected to the party line to control the interchange of data between the remote terminals and the computer so that an operator at a one of the remote terminals may interrogate the computer and receive a message signal indicative of a customer's credit status.

In this configuration, the central computer may be connected by way of a data multiplexer, a high speed data link and a remote voice response sub-system to a telephone party line, which in turn is connected to the various remote terminals in accordance with the present invention. Each terminal has a keyboard, a digital storage means, a tone pair code oscillator, an idle tone recognition circuit and a standard telephone receiver. Digital signals comprising an inquiry message are generated and stored at the terminal and, when the message has been completely generated and stored, it is transmitted in tone pair code only if the terminal senses an idle tone signal indicating that the party line is available. At the remote voice response substation, the initial tone pair code received from the party line halts the generation of the idle tone for that party line and the total message is transmitted over trunk lines in the form of a high speed digital signal to the central computer. The computer reply is transmitted back in the same high speed digital form to the remote sub-station where it is converted to a voice message signal for transmission along the party line to the originating terminal and its operator. Following transmission of the voice response signal onto the party line, the remote substation restores the idle tone signal to the line. The remainder of the terminals on this party line are inhibited from either receiving this voice response or transmitting their own inquiry message during the period when no idle tone signal is applied to those terminals, i.e., from the time of receipt of the first tone pair code signals at the remote sub-station until restoration of the idle tone signal to the party line at the sub-station.

Broadly speaking in the present invention, the idle tone signal is received from the telephone party line by a line modem connected thereto. (The idle tone signal, indicating availability of the party line, is generated by the remote substation and is applied to the party line during periods when no terminal is engaged in a communication exchange with the computer). That received idle tone signal frequency modulates (F.M.) an "outbound" r.f. carrier signal (at a first frequency $f_1$) and the resultant F.M. signal is applied via a hybrid coupling network to an a.c. power line. The modulated carrier signal as transmitted on the power line is received at a plurality of terminal modems connected thereto, with each terminal modem being associated with one of a plurality of remote inquiry terminals. The applied signal at the terminal modems is demodulated at each inquiry terminal so that the resultant signal has the same form as the idle tone signal intially applied to the line modem from the telephone line. This recovered idle signal is applied to the associated remote inquiry terminal at each location.

When the party telephone line is idle, as indicated by the applied idle tone at each of the terminals, an operator may generate a computer interrogation signal at any one of the remote inquiry terminals. The keyboard, storage and tone pair generating networks (as described more fully in the above referenced application Ser. No. 296,790) at that interrogating terminal generate a sequence of tone pair code (interrogating) signals for transmission to the central computer connected via the party line. Transmission of these tone signals can be initiated at an inquiry terminal only when the idle tone is present. In accordance with the present invention, if this idle tone is present, the modem associated with the inquiry terminal will first apply an unmodulated "inbound" r.f. carrier signal (at a second frequency $f_2$) to the power line. After a brief interval, the modem frequency modulates this $f_2$ carrier with a tone pair code signal. The resulting modulated r.f. carrier signal, preceded by an interval of unmodulated r.f. carrier signal (at frequency $f_2$) is transferred by the power line from the terminal modem and is received by the line modem. The unmodulated carrier portion of the signal received by the line modem disables the generator for the "outbound" carrier signal (at frequency $f_1$) at the line modem for the duration of the transmission by the interrogating signal. As a result, transmission over the power line of the outbound r.f. carrier signal (at frequency $f_1$) modulated with the idle tone signal, is discontinued, interrupting the idle tone signal which had been applied to all remote terminals connected to the power line. Consequently, those terminals other than the inquiring terminal are disabled and cannot either receive or transmit any signal until the idle tone is restored.

At the line modem, the signal received via the power line from the inquiring terminal is demodulated so that the resultant interrogating signal again comprises the tone pair code signal as applied to the terminal modem by the interrogating terminal. This tone pair code signal is applied to the telephone party line, whereupon it is in turn applied to the remote substation. At the remote sub-station the tone pair code signal is then suitably transformed and transmitted via the high speed data link, and data multiplexer to the central computer. Upon receipt of the first tone pair at the sub-station, transmission of the idle tone signal on the party line is interrupted in the manner described in the above referenced application, Ser. No. 296,790. It will be noted that the idle tone signal has already been removed from the power line interconnection between the party line and the remote terminals (by the disabling of the line modem outboard carrier signal generator).

In response to the inquiry, the central computer generates a digital reply signal. The digital reply signal is applied via the multiplexer, and high speed data link to the voice response sub-station. At the sub-station the digital reply signal is transformed to a voice reply signal and applied to the telephone party line and in turn to the line modem. At the line modem, the incoming voice reply signal frequency modulates the outbound r.f. carrier signal (at frequency $f_1$) which is applied to the power line and is in turn demodulated in the various terminal modems. As above noted, only the interrogating terminal which has previously transmitted a tone pair code signal is effective to receive this demodulated reply voice signal.

Following transmission of the voice reply signal by the remote sub-station, the idle tone signal is again applied via the telephone party line to the line modem. At the line modem, the idle tone signal modulates the outbound $f_1$ carrier signal and the resultant signal is applied to the power line. This signal is received by the various terminal modems at the remote terminals, thereby indicating that the party line is again available for the generation of an inquiry message from one of the remote terminals.

Thus, in the present invention, an apparatus is provided to interface a telephone party line extending from a digital computer with a plurality of remote inquiry terminals. The interface apparatus is adapted to transfer message signals between the party line and the inquiry terminals by way of an existing a.c. power line. In this manner, a system of remote terminals may be connected to a computer and telephone line extending therefrom, within a building, such as a department store, using only the a.c. power lines already existing in the building, thereby eliminating the requirement of a separate interconnecting cable network. In addition, the inquiry terminals may be relocated with relative ease by merely removing the standard a.c. power plug for the terminal at the old location and inserting the plug at the new location. No further re-wiring is required.

Other features of the invention will be evident from the following description of the preferred embodiment.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
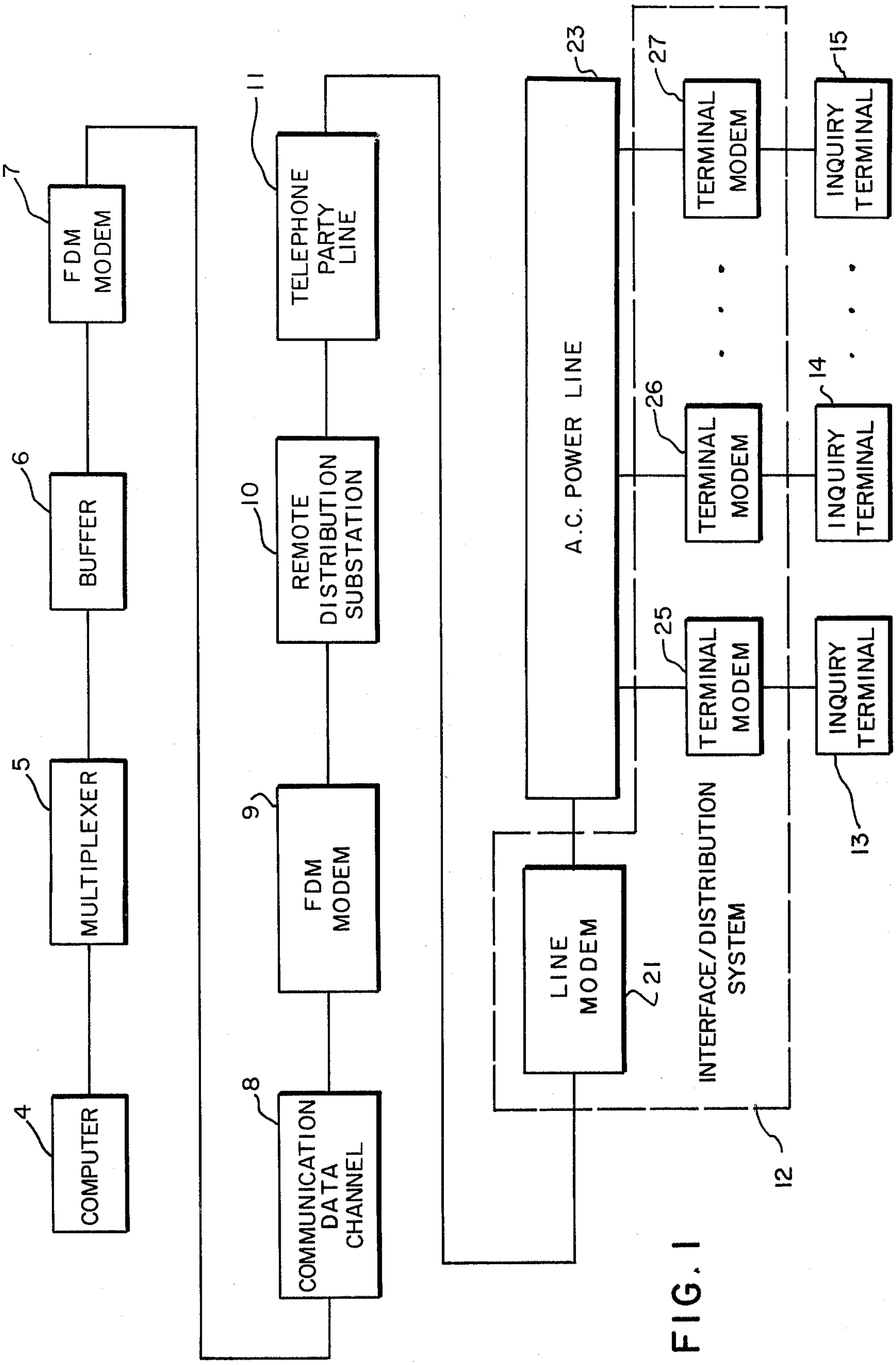
FIG. 1 shows in block diagram form an interface system in accordance with the present invention configured in a credit verification system.

A system in accordance with the present invention is shown in FIG. 1 configured with a credit verification system as taught in U.S. Patent application Ser. No. 296,790, assigned to the assignee of the present invention. In that figure, a central computer 4 is shown connected by way of multiplexer 5, buffer 6, FDM modem 7, communication data channel 8, FDM modem 9, remote voice response sub-station 10, a telephone party line 11, interface/distribution system 12 and power line 23 to a plurality of dispersed inquiry terminals 13, 14, and 15. In this configuration, the computer 4, multiplexer 5, buffer 6, modem 7, data channel 8, modem 9, sub-station 10, party line 11, and inquiry terminals 13–15 are constructed and function in accordance with the teachings of the above referenced application, Ser. No. 296,790. The interface/distribution system 12 is the subject matter of the present invention. This system 12 provides an interface between the party line 11 and the plurality of dispersed inquiry terminals 13–15.

Interface/distribution system 12 is shown to have a line modem 21 interfacing party line 11 and an a.c. power line 23. It will be understood that power line 23 may be a standard 110 volt a.c. power line used for the distribution of a.c. power within a building structure. At any point along the power line 23, terminal modems may be connected by means of a standard plug and socket connector. In FIG. 1, three dispersed terminal modems 25, 26, and 27 are shown. The terminal modems are also connected to an associated inquiry terminal which is external to the interface/distribution system 12. The terminal modems 25–27 are connected respectively to inquiry terminals 13–15.

Briefly, in operation, idle tone signals and voice reply signals applied by sub-station 10 to party line 11 are received and frequency modulate an r.f. carrier signal at the line modem 21. The resultant modulated signals are transferred by a.c. power line 23 to the terminal modems 25–27 connected to line 23. Each of the respective terminal modems demodulates the received signals and applies the resultant baseband signals to the associated ones of the inquiry terminals 13–15.

At any one of the inquiry terminals 13–15, computer interrogation signals may be generated by an operator and applied to the respective one of terminal modems 25–27. The respective one of the terminal modems 25–27 generates an unmodulated r.f. carrier burst signal followed by the r.f. carrier signal modulated by the interrogation signal. This r.f. signal is applied by way of the power line 23 to line modem 21. At modem 21, the burst of r.f. carrier signal and the following modulated r.f. carrier signal is detected and used to interrupt the transmission over the power line 23 of the outbound r.f. carrier modulated by the idle tone signal by line modem 21. In addition, line modem 21 is effective to demodulate the received r.f. carrier signal modulated with the interrogation signal. The resulting baseband interrogaton signal is applied by way of the telephone party line 11 to sub-station 10 and eventually to the computer 4. A more detailed description of this operation is provided below.

Figure 2:
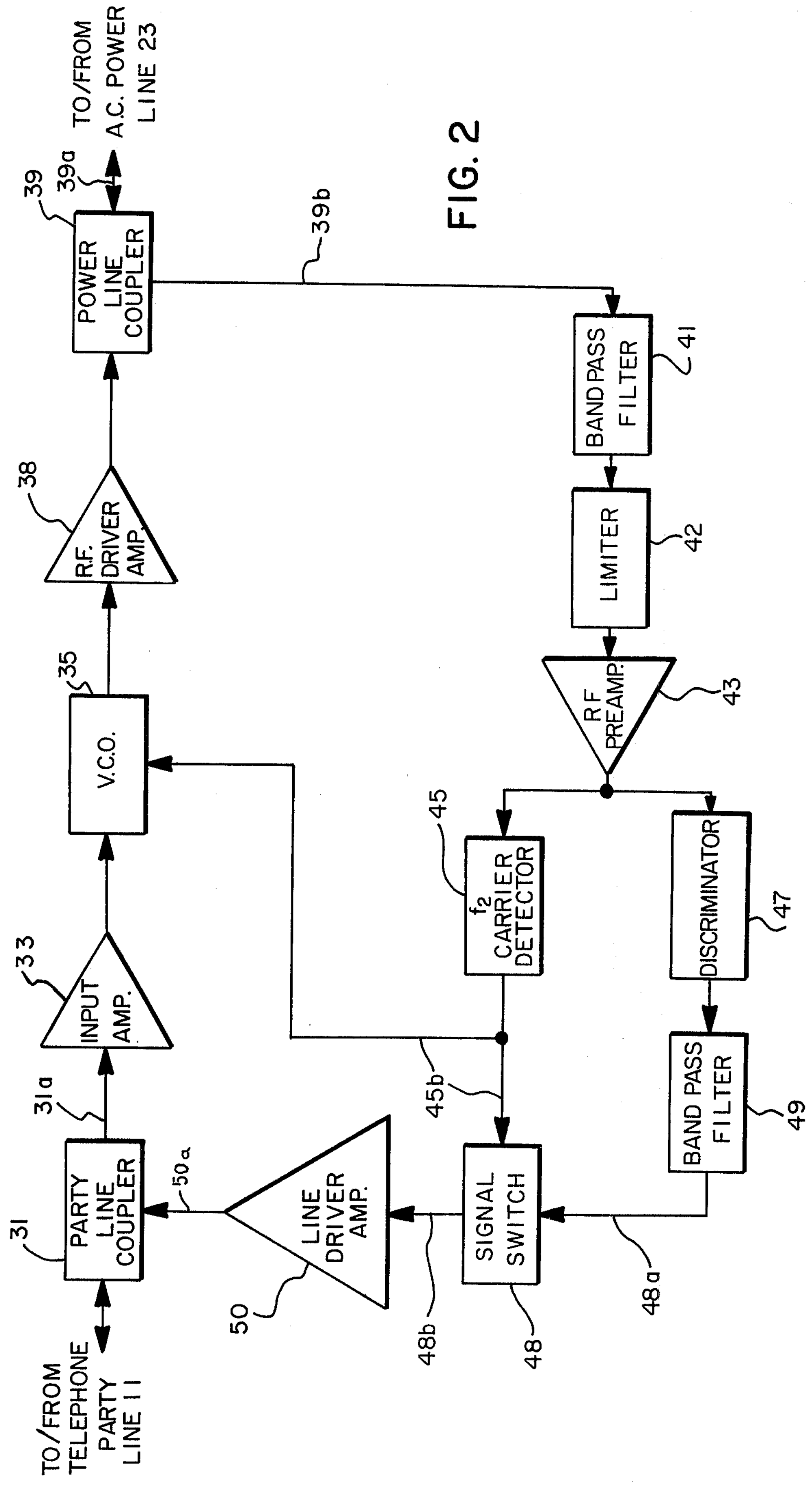
FIG. 2 shows in block diagram form a line modem for use in the interface system of FIG. 1.

Line modem 21 is shown in block diagram form in FIG. 2. In that figure, party line coupler 31 provides a signal path for idle tone and voice reply signals on party line 11 from the computer 4 to the input amplifier 33 via line 31*a*. The output of amplifier 33 is connected to a modulating input of the voltage controlled oscillator (VCO) 35. A second input to VCO 35 is a digital control signal for controlling VCO 35 to be either on or off in response to the state of the demodulator portion of line modem 21, as described below.

When VCO 35 is on, VCO 35 oscillates to produce a first r.f. carrier at frequency $f_1$ when no modulating signal is present. An amplified idle tone or voice replay signal applied by amplifier 33 at the modulating input to VCO 35 frequency modulates the $f_1$ carrier signal. When VCO 35 is off, no output signal is provided. The output signal of VCO 35 is applied by way of r.f. driver amplifier 38 to power line coupler 39. Coupler 39 provides a signal path via line 39*a* for the modulated r.f. signal from VCO 35 to the a.c. power line 23 and in turn to all terminal modems connected to line 23.

Tone pair code signals which have frequency modulated a second r.f. carrier signal in the terminal modem at frequency $f_2$, are applied from power line 23 and transferred by way of line 39*a* to the power line coupler 39 of line modem 21. The received signal centered about this second r.f. carrier signal (at frequency $f_2$) is routed by power line coupler 39 and line 39b to bandpass filter 41. Filter 41 is effective to pass the modulated signals centered about carrier frequency $f_2$ and to suppress signals outside that band (particularly signals centered about the $f_1$ carrier signal). The passed signal is applied to limiter 42 and then to an r.f. preamplifier 43. The signal output of preamplifier 43 is applied to both $f_2$ carrier detector 45 and phase lock discriminator 47.

Detector 45 generates a d.c. control signal at all times when an $f_2$ carrier signal is applied by r.f. preamp 43. This control signal is applied to both VCO 35 and to signal switch 48 via line 45*b*. The control signal on this line is effective to turn off the VCO 35 at all times when the $f_2$ carrier signal is detected, VCO 35 being turned on at all other times. The control signal is effective at switch 48 to provide a signal path between lines 48*a* and 48*b* at all times when a $f_2$ carrier signal is detected.

Phase lock discriminator 47 is effective to demodulate the received modulated signal down to the baseband tone pair code signal. The discriminator 47 output signal is passed through band pass filter 49 and applied to line 48*a*. During all periods when a carrier signal is present at detector 45, the tone pair code signal is applied via signal switch 48 to line 48*b* to line driver amplifier 50. The output of line driver amplifier 50 is applied by way of line 50*a* and routed through coupler 31 to telephone party line 11. This signal is of the form of the tone pair code signal as applied from the remote terminal.

Figure 3:
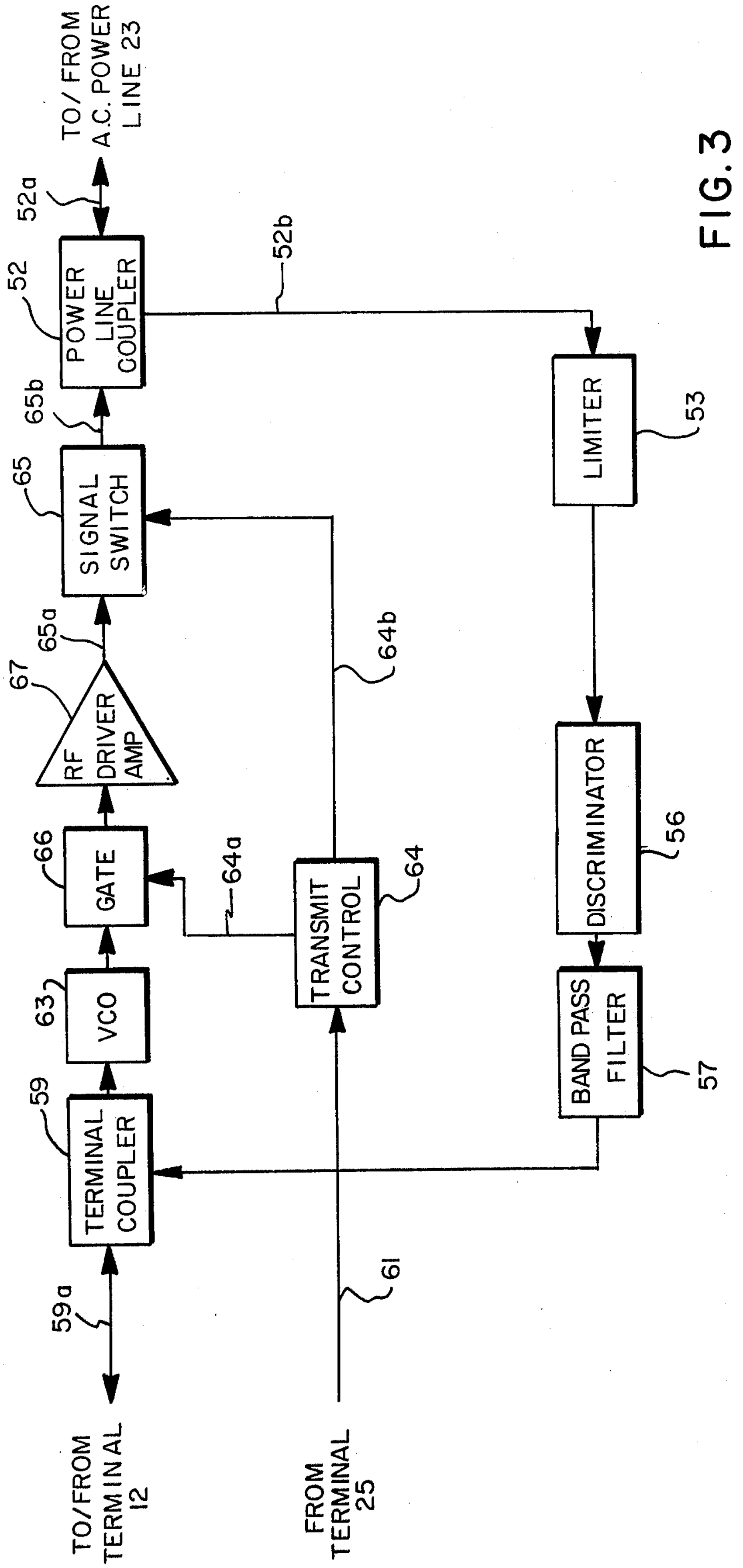
FIG. 3 shows in block diagram form a terminal modem for use in the interface system of FIG. 1.

A detailed block diagram of terminal modem 25 is shown in FIG. 3. In that figure, idle tone and reply voice signals which modulate the carrier signal (at frequency $f_1$) are applied from a.c. power line 23 to power line coupler 52 by way of line 52*a*. These received signals are routed by coupler 52, line 52*b*, and limiter 53 to discriminator 56. Discriminator 56 and bandpass filter 57 are effective to demodulate the received signal to return it to the baseband idle tone or voice reply signal, i.e. in the form as applied from party line 11 to line modem 21. This latter baseband signal is then transferred by way of terminal coupler 59 and lines 59*a* to terminal 13.

At times when an operator directs terminal 13 to generate an interrogation signal to be transferred to the computer 4, a transmit control signal is applied via line 61 to transmit control 64. The control 64 generates signals on lines 64*a* and *b* which are effective to activate shunt switch 66 and signal switch 65 in order to provide a signal path from VCO 63, through amplifier 67, lines 65*a* and 65*b* to power line coupler 52.

After the transmit control signal is applied on line 61, a tone pair code (interrogating) signal is also applied by terminal 13 via line 59*a* to terminal coupler 59. This signal is routed by coupler 59 to the frequency control input of VCO 63. In response thereto, VCO 63 provides an output carrier signal at frequency $f_2$ as F.M. modulated by the applied tone pair code signal. When actuated, shunt switch 66 passes the VCO 63 output signal to r.f. drive amplifier 67, the output of which, in turn, is applied by way of line 65a, signal switch 65 and line 65*b* to power line coupler 52. Coupler 52 is effective to apply the r.f. carrier signal (at frequency $f_2$) as modulated by the tone pair code signal to the a.c. power line 23 by way of line 52*a*. That signal is then applied to the line modem 21.

FIGS. 4*a* and 4*b* and 5*a* and 5*b* show respectively a practical embodiment of line modem 21 and terminal modem 25 in schematic form. The circuits shown in those figures are not intended to limit the present invention. It will be understood that alternative embodiments of the present invention may use circuit components having different values than those shown. In addition, such embodiments may use different circuit configurations in keeping with the present invention.

For the embodiment of FIGS. 4*a* and 4*b* and 5*a* and 5*b*, the r.f. carrier signal generated at line modem 21 is at a frequency $f_1$ equal to 150 KHz. The VCO 35 provides f.m. modulation characteristics having a deviation of ± 10 percent maximum, and an f.m. bandwidth for a 1,000 Hz signal which is approximately equal to ± 20 KHz. The overall system signal-to-noise ratio for a typical power line connection is approximately equal to 25dB for the voice or tone signals conveyed by the modem pair and the power line medium.

Figure 4A:
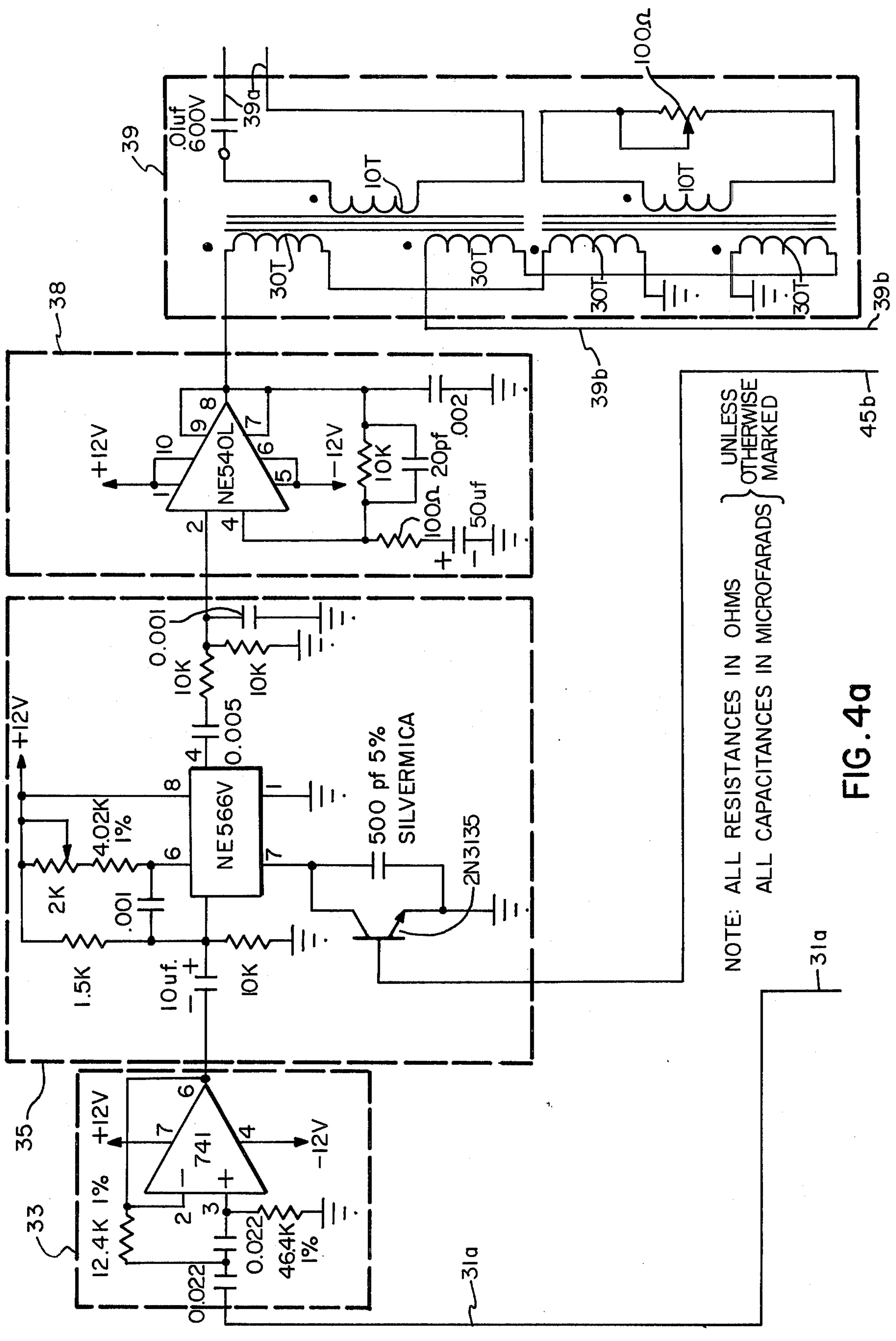
FIGS. 4*a* and 4*b* shows in schematic form a practical embodiment of the line modem of FIG. 2.

The power line coupler 39 shown in FIG. 4*a* is an r.f. hybrid circuit having a return loss on the order of 12dB, or greater. The respective transformer turn ratios and winding sense for the various parts of coupler 39 are also shown in FIG. 4*a*.

The r.f. carrier signal generated at terminal modem 25 is at frequency $f_2$ equal to 350 KHz. The VCO 63 provides similar f.m. modulation characteristics as the corresponding VCO in the line modem 21.

In the system as shown in FIGS. 1, 4*a* and 4*b* and 5*a* and 5*b*, and in accordance with the embodiment of the credit verification system taught in the above referenced application Ser. No. 296,790, the idle tone signal is a sinusoidal signal having a frequency 1,800 Hz. The voice reply signal as may be applied by the remote voice response sub-station 10 is also in the audio frequency range. Similarly, the tone pair code (interrogating) signal generated by the terminal 13 is an audio frequency signal. This latter signal may comprise a sequence of tone bursts produced by a tone pair telephone signal generator, with each burst being 33 milliseconds in duration and separated by a 33 millisecond period.

Figure 4B:
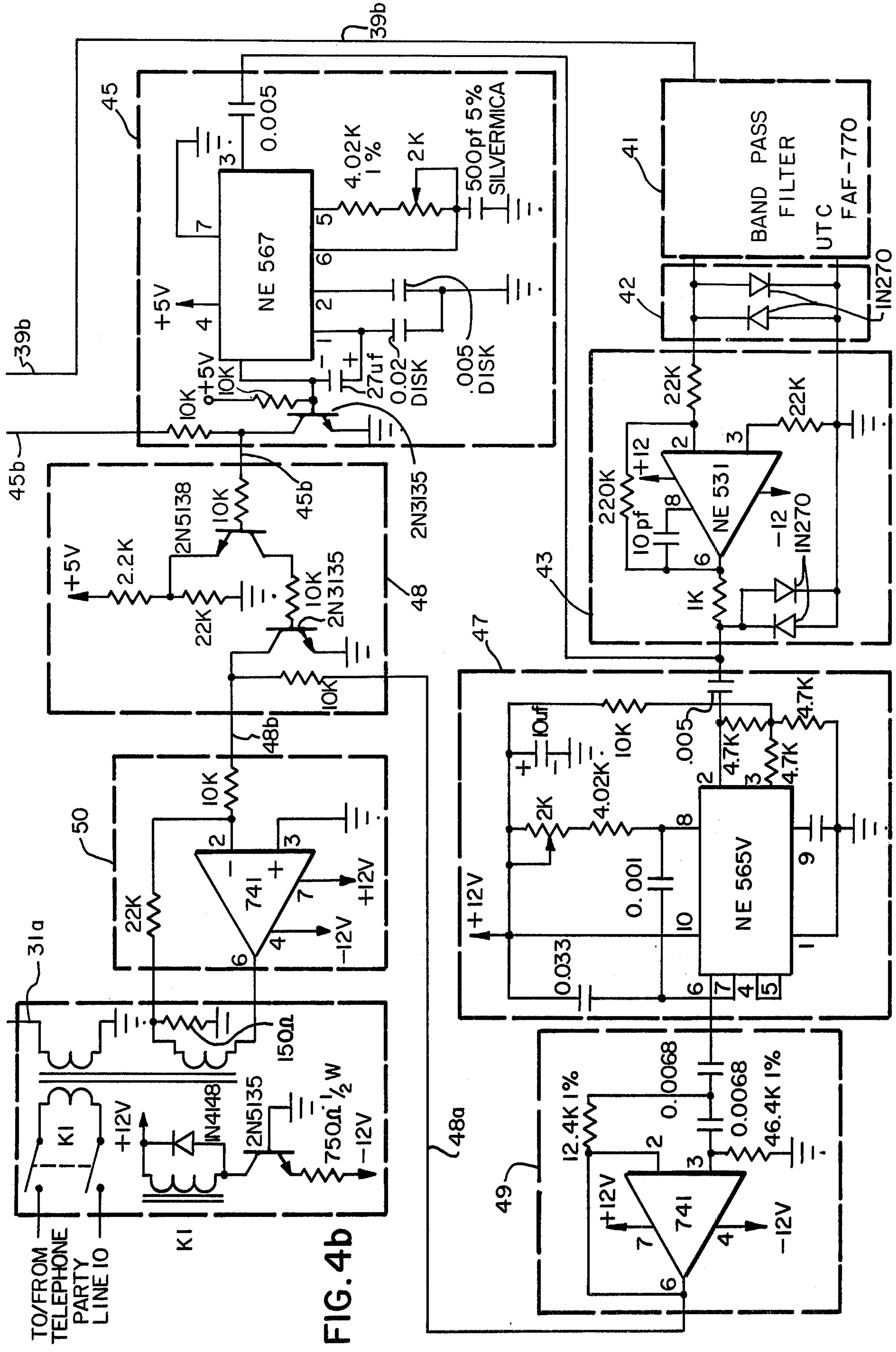

In operation in the standby state (i.e., no computer interrogation messages in transit) for the system shown in FIG. 1 in combination with FIGS. 4*a* and 4*b* and 5*a* and 5*b*, the 1,800 Hz idle tone signal is applied by substation 10 to telephone party line 11. This signal, as applied to the line modem having the form of FIGS. 4*a* and 4*b*, is transferred by transformer coupler 31 to the integrated circuit input amplifier 33. The received idle tone signal then modulates the 150 KHz carrier signal via the integrated circuit VCO 35. The idle tone modulated carrier signal is then applied by way of the integrated circuit r.f. driver 38 and the r.f. hybrid power line coupler 39 to the a.c. power line 23.

Figure 5A:
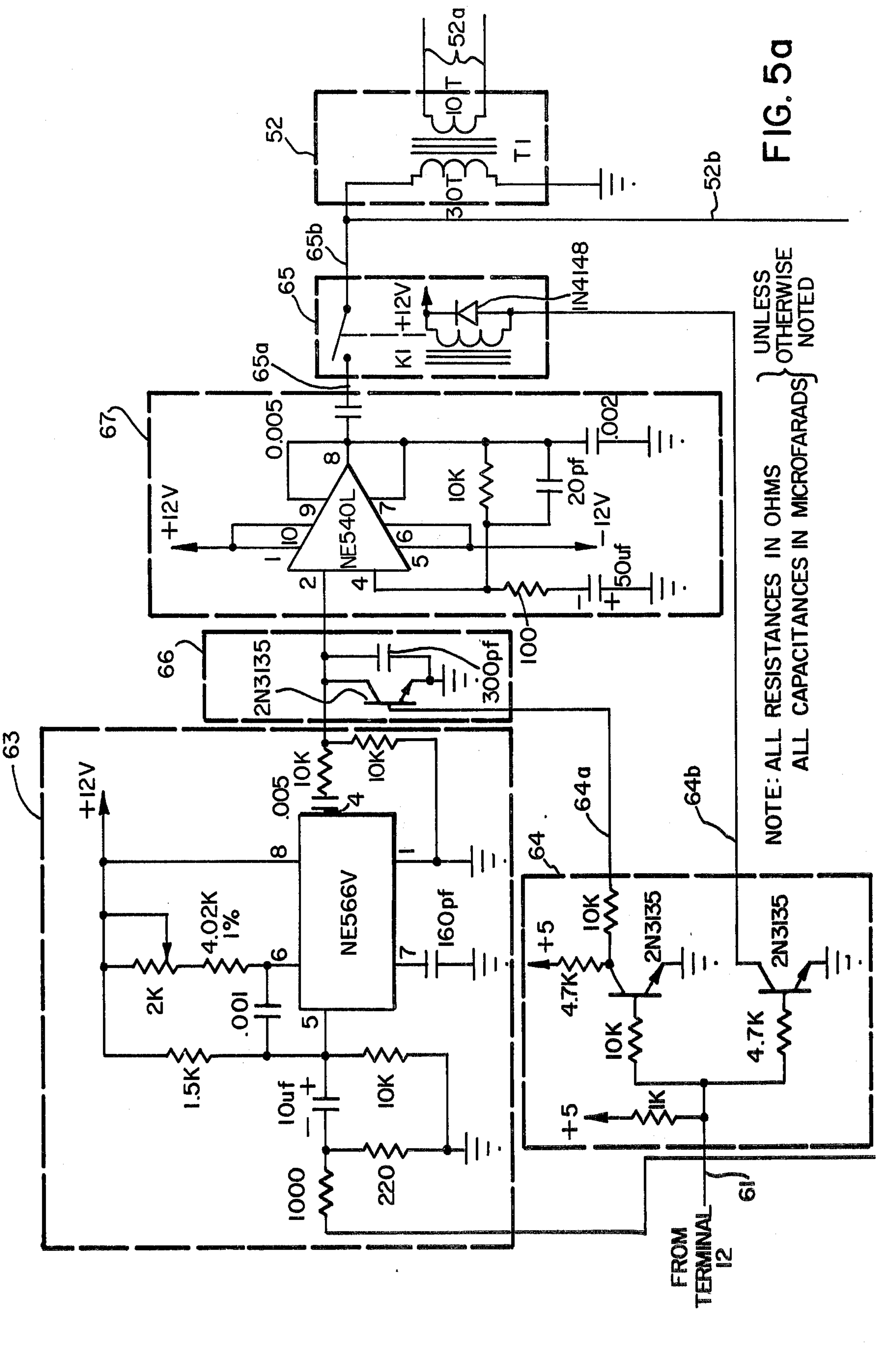
FIGS. 5*a* and 5*b* shows in schematic form a practical embodiment of the terminal modem of FIG. 3.
Figure 5B:
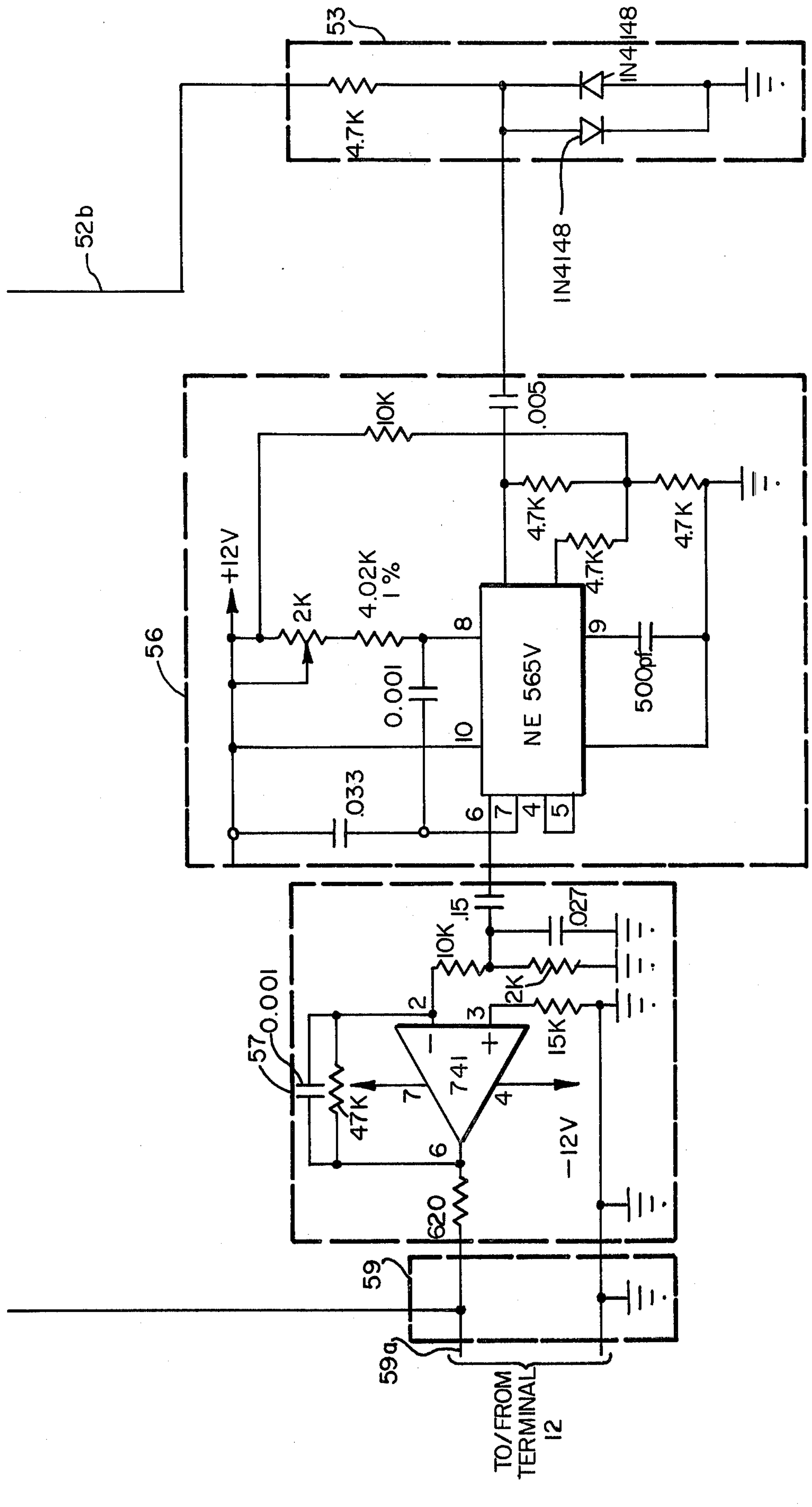

The modulated idle tone signal is received by terminal modem 25 shown in FIGS. 5*a* and 5*b*. Normally (except when transmitting a tone pair interrogating signal) terminal modem 25 maintains signal switch 65 in a opened position thereby insuring that the modulated idle tone signal as received via the power line coupler 52 is applied in total to limiter 53 and that no part of this signal is shunted to ground via the output of driver 67. As shown in FIGS. 5*a* and 5*b*, is a bipolar diode clamp having its output connected to an integrated circuit 150 KHz phase locked loop discriminator 56. The discriminator output signal is then applied to an integrated circuit active high pass filter 57. High pass filter 57 is provided to suppress power line frequency related impulse noise. The resultant demodulated 1,800 $H_z$ idle tone signal is presented at line 59*a*.

In the credit verification system embodying the present invention, as shown in FIG. 1, in conjunction with FIGS. 4*a* and 4*b* and 5*a* and 5*b*, an inquiry terminal 13 may generate an interrogation signal directed to the computer 4, as described more fully in the above referenced application Ser. No. 296,790. As described in that application, an inquiry terminal such as terminal 13 may only generate such a signal at times when an idle tone signal is received via line 59*a* indicating that the party line 11 is available. In that credit verification system, terminal 13 may generate a transmit control signal which is applied by way of line 61 of terminal modem 25 to transmit control 64 which comprises a transistor switch. The transmit control signal is applied for the duration of a tone pair code signal which serves as the interrogation signal for computer 4. As seen from FIGS. 5*a* and 5*b*, an applied tone pair code signal applied by way of line 59*a* is directly coupled through coupler 59 to the input of an integrated voltage controlled oscillator (VCO) 63 circuit which is tuned to a nominal (unmodulated) frequency $f_2$, of 350 KHz.

A shunt switch 66 is connected to the output of VCO 63. In response to the transmit control signal from line 61, transmit control 64 generates a signal which is applied (by way of line 64*a*) to switch 66. Switch 66 is then effective to couple the output signal from VCO 35 to amplifier 67. The switch 66 otherwise prevents an output signal from VCO 63 from being applied to amplifier 67.

Transmit control 64 also includes a relay driver which is energized by the transmit signal. The relay driver is connected by way of line 64*b* to a relay coil and associated contacts comprising signal switch 65. The relay contact comprise the signal path connection of signal switch 65, and are thus normally open except when the transmit signal is applied to transmit control 64.

Modulator 63 frequency modulates the 350 KHz carrier signal with the applied tone pair code signal and applies that signal by way of the integrated circuit r.f. driver amplifier 67, the relay contacts of signal switch 65, the transformer power line coupler 52 and line 52*a* to the a.c. power line 23.

In the present embodiment, the transmit control signal applied to line 61 is controlled by inquiry terminal 13 to commence 67 milliseconds prior to the first tone burst of the tone pair code signal. The tone pair code signal thereafter includes a sequence of 33 millisecond tone bursts alternated with 33 millisecond idle periods. Thus the modulated tone pair code signal applied to line 23 commences with a 67 millisecond burst of pure carrier signal (at 350 KHz) followed by alternate periods of 33 millisecond bursts of 350 KHz carrier signal frequency modulated by a tone signal and 33 millisecond bursts of pure 350 KHz carrier signal.

When this tone pair modulated carrier signal is received at the line modem 21 on line 39*a*, the signal is routed by the r.f. hybrid power line coupler 39 and line 39*b* to bandpass filter 41. In the present embodiment, bandpass filter 41 includes a serially connected 150

KHz trap circuit and a 350 KHz tank circuit. In the circuit of FIGS. 4*a* and 4*b*, the trap circuit suppresses all 150 KHz signals by approximately 24 dB while the 350 KHz enhances the signal centered about that frequency by approximately 24 dB. The filtered signal is then applied to diode limiter 42. The limited output signal of the limiter 42 is applied to the integrated circuit r.f. preamplifier 43 and then to both $f_2$ carrier detector 45 and discriminator 47.

Carrier detector 45 is shown in FIG. 4*b* to be an integrated circuit phase locked loop detector which produces a d.c. output control signal at all times when the 350 KHz carrier signal is applied to the input of detector 45. Thus, the output of detector 45 provides a control signal commencing 67 milliseconds prior to the reception by discriminator 47 of a signal including tone pair code modulated carrier signals and extending for the duration of the transmission from terminal modem 25.

The output control signal from detector 45 is applied to the transistor switching circuit included in the f.m. modulator 35 of FIG. 4*a*. For the duration of this control signal, the modulator 35 is disabled so that no output is provided to the r.f. driver amplifier 38. By means of this switching operation, potential interference from the modulator portion of line modem 21 is reduced during the period commencing 67 milliseconds prior to and during the required demodulation of the received tone pair code modulated carrier signal. Spurious signals from the high level output of amplifier 38 would otherwise add to the noise level from which the received signal from terminal modem 25 must be detected by discriminator 47.

In addition, it will be understood that the disabling of VCO 35 results in the removal of the idle tone modulated carrier signal from power line 23 (and, in turn, removal of the 1,800 Hz idle tone signal from the inputs of all remote terminals connected to line 23). In response to the interruption of the idle tone signal, all terminals, except the interrogating terminal, are thereafter inhibited from either transmitting or receiving any signal on power line 23, until the resumption of the idle tone at the inputs to the remote terminals in accordance with the terminal description of application Ser. No. 296,790.

Discriminator 47 is an integrated circuit 350 KHz phase locked loop discriminator and operates in a manner similar to the discriminator 56 of terminal modem 25. The following integrated circuit active highpass filter 49 completes the demodulator circuit and applies a demodulated tone pair code signal to the input of signal switch 48. Highpass filter 49 is provided to suppress power line frequency related impulse noise.

The control signal from detector 45 also controls the transistor switch comprising signal switch 48 so that during the detection period the resultant audio signal may be applied directly to the integrated circuit line driver 50. That signal is then transformer coupled by party line coupler 31 to the telephone party line 11 where it is subsequently applied to computer 4.

In the credit verification system as shown in FIG. 1, the remote sub-station 10 interrupts its transmission of the 1,800 Hz idle tone signal which it had formerly been applying to party line 11 upon receipt of a tone pair code signal from line modem 21. It will be understood that the idle tone has already been effectively removed from the non-inquiring remote terminals by the disabling of VCO 35. However, sub-station 10 ensures that, following reactivation of VCO 35 at the completion of the demodulation of the inquiry signal, the idle tone is not applied to the non-inquiring terminals until after the appropriate computer 4 reply signal has been received by the inquiring terminal. The computer 4 responds to the received tone pair code signal from the interrogating terminal by generating a digital reply signal and applying that signal to sub-station 10. Substation 10 transforms that digital signal to a voice response signal and applies that signal via telephone party line 11 to line modem 21. By this time, terminal modem 25 has ceased its generation of the 350 KHz carrier signal, having completed transmission of a tone pair code signal. As a result, the output of detector 45 no longer disables VCO 35 of line modem 21 and the voice reply signal as applied to line modem 21 via party line 11 from sub-station 10 is received and modulates the 150 KHz carrier signal in a similar fashion to the line idle signal, as described above.

The resultant modulated signal is applied by way of driver amplifier 38 and power line coupler 39 and line 39*a* to a.c. power line 23. At the terminal modem 25, (and all other terminal modems connected to a.c. power line 23), the received modulated voice reply signal is then demodulated in a manner similar to that described above for the line idle tone signal. The resultant signal is then applied via the line 59*a* of the various terminal modems to the associated inquiry terminals. It will be understood that among the various inquiry terminals, as described more fully in U.S. Patent application Ser. No. 296,790, only the inquiry terminal which first gained access to the telephone party line 11 while an idle tone signal was present on the line and transmitted a tone pair code signal is then enabled to receive the voice response signal generated by the sub-station 10. Thus, in the present configuration of FIG. 1, only the inquiry terminal 13 (that terminal having first sent a tone pair code signal following the receipt of an idle tone signal) may receive the demodulated voice reply signal as applied by terminal modem 25. That is, inquiry terminals 14 and 15 may not receive that voice reply signal as applied by terminal modems 26 and 27 nor may any other terminals connected to the power line 23.

Following the transmission by sub-station 10 of the voice reply signal to the interrogating inquiry terminal 13, that sub-station again generates the idle tone signal on telephone party line 11, indicating that the party line 11 is again available for an interrogation message. System 12 then responds in the above-described fashion to transfer that idle tone signal to all of the inquiry terminals connected by their associated terminal modems to the a.c. power line 23. In this manner, the credit verification system is enabled to respond to the next interrogation signal generated by a one of the inquiry terminals 13–15.

The invention may be embodied in other specific forms without departing from the spirit or essential characteristics thereof. For example, the modulating signals may include binary code sequences which cause the nominal frequency of the carrier signals to shift from frequency $f_1$ to $f_1 \pm \Delta f_1$, or from frequency $f_2$ to $f_2 \pm \Delta f_2$ respectively. In such systems, the modulated carrier signals may still be used to convey such code sequences over a power line.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a system for communicating between a central computer and a plurality of remote inquiry terminals having a communication data channel connecting said central computer and a distribution sub-station, and a telephone party line coupled between said sub-station and said plurality of remote inquiry terminals, wherein an alternating current power line for transmission of electrical power at frequency $f_0$, is located adjacent to at least one of said remote inquiry terminals, the improvement comprising:

a means for utilizing said alternating current power line for coupling one or more of said remote inquiry terminals to said telephone party line, said means for utilizing said alternating current power line comprising:

a party line modem including: a party line coupling means for coupling signals from said party line to said line modem and from said line modem to said party line, a controlled oscillator generating a carrier signal nominally at a frequency $f_1$, $f_1$ being substantially different from the frequency $f_0$ of the current on said alternating current power line, said oscillator, providing as an output said carrier signal at frequency $f_1$ as modulated by signals received through said party line coupler from said party line, a power line coupling means coupling said party line modem to said power line, said power line coupling means only passing signals substantially at frequency $f_1$ from said modem to said power line and only passing signals substantially at a frequency $f_2$ from said power line to said party line modem, wherein frequency $f_2$ differs substantially from frequency $f_1$ and from the power transmission frequency $f_0$ of said alternating current power line, said power line coupling means isolating said party line modem from the power current on said alternating current power line, a demodulator connected to said power line coupling means for demodulating said modulated signals substantially at frequency $f_2$ and for providing output baseband signals, the output of said demodulator being connected to said party line coupler for providing transmission of said output baseband signals from said demodulator on said party line; and at least one terminal modem associated with one of said remote inquiry terminals, said terminal modem including:

a terminal coupling means for coupling signals from said terminal modem to the associated one of said inquiry terminals and from the associated one of said inquiry terminals to said terminal modem, a controlled oscillator for generating a carrier signal nominally at said frequency $f_2$, and connected to said terminal coupling means, said oscillator providing as an output signal said carrier signal nominally at frequency $f_2$ as modulated by signals transmitted from said associated inquiry terminal through said terminal coupling means, a power line coupling means coupling said terminal modem to said power line, said power line coupling means passing only said signals substantially at frequency $f_2$ from said terminal modem to said power line and passing only signals substantially at frequency $f_1$ from said power line to said terminal modem, said power line coupling means isolating said terminal modem from the power current at frequency $f_0$ on said alternating current power line, a demodulator coupled to said power line coupling means for demodulating said modulated signals substantially at frequency $f_1$ and for providing output baseband signals, the output of said demodulator being coupled through said terminal coupling means to the associated one of said inquiry terminals.

2. The improvement in accordance with claim 1 wherein at the commencement of a transmission cycle from any one of said plurality of remote inquiry terminals, a transmit control signal is produced at said inquiry terminal permitting the oscillator in the associated terminal modem to produce as an output signal a carrier signal substantially at frequency $f_2$, and wherein said party line modem includes detector means responsive to the receipt of said carrier signal substantially at frequency $f_2$ to disable the oscillator in said party line modem for the duration of the transmission cycle from the transmitting inquiry terminal.

3. An apparatus in accordance with claim 2 wherein normally said sub-station produces and applies a line status signal to said party line, and wherein said sub-station removes said line status signal from said party line for periods, each period commencing at the receipt at said sub-station of the initial transmission from any one of said remote inquiry terminals and terminating following the application by said sub-station of a reply signal from said computer to said inquiring terminal on said party line, the improvement comprising means in all of said remote inquiry terminals for preventing all terminals except the inquiry terminal from transmitting signals on or receiving signals from said party line whenever said line status signal is removed.

4. An improvement in accordance with claim 2 wherein said party line modem includes a switching means between said demodulator and said party line coupling means, said switching means being in a position connecting the output of said demodulator to said party line coupling means upon receipt and detection of said carrier signal substantially at frequency $f_2$ at said detector means, and being in a position disconnecting said demodulator output from said party line coupler otherwise.

5. An improvement in accordance with claim 1 including in said party line modem signal enhancing means connected between said power line coupling means and said demodulator means for enhancing signals substantially at frequency $f_2$ and suppressing signals substantially at frequency $f_1$.

6. An improvement in accordance with claim 1 wherein said means for coupling said party line modem to said power line comprises a hybrid coupling circuit.

7. An improvement in accordance with claim 1 wherein said party line modem oscillator and said terminal modem oscillator are frequency modulators.

* * * * *